US009514441B2

(12) United States Patent
Klassen et al.

(10) Patent No.: US 9,514,441 B2
(45) Date of Patent: Dec. 6, 2016

(54) METHOD AND APPARATUS FOR SWITCHING BETWEEN CONCURRENT MESSAGING SESSIONS

(75) Inventors: Gerhard D. Klassen, Waterloo (CA); Shaul Wisebourt, Waterloo (CA)

(73) Assignee: BlackBerry Limited, Waterloo (CA)

( * ) Notice: Subject to any disclaimer, the term of this patent is extended or adjusted under 35 U.S.C. 154(b) by 579 days.

(21) Appl. No.: 11/154,596

(22) Filed: Jun. 17, 2005

(65) Prior Publication Data
US 2006/0288107 A1  Dec. 21, 2006

(51) Int. Cl.
*G06F 9/44* (2006.01)
*G06Q 10/10* (2012.01)

(52) U.S. Cl.
CPC ........... *G06Q 10/107* (2013.01); *G06F 9/4443* (2013.01)

(58) Field of Classification Search
CPC .................................... G06F 9/4443
USPC .......... 709/204, 206, 207; 370/260; 715/758
See application file for complete search history.

(56) References Cited

U.S. PATENT DOCUMENTS

| | | | |
|---|---|---|---|
| 6,907,447 B1 * | 6/2005 | Cooperman et al. ......... 709/203 |
| 7,120,455 B1 * | 10/2006 | Chen et al. .................... 455/466 |
| 7,152,093 B2 * | 12/2006 | Ludwig et al. ............... 709/204 |
| 7,154,999 B2 | 12/2006 | Florkey et al. |
| 7,277,719 B2 * | 10/2007 | Klassen et al. ............... 455/466 |
| 7,281,215 B1 * | 10/2007 | Canfield et al. .............. 715/752 |
| 7,292,870 B2 * | 11/2007 | Heredia et al. ............... 455/466 |
| 7,818,375 B2 * | 10/2010 | Malik ................... G06Q 10/107 709/204 |
| 2001/0047626 A1 | 12/2001 | Ohkado |
| 2002/0062350 A1 | 5/2002 | Machiro |
| 2002/0163504 A1 * | 11/2002 | Pallakoff ............... G06F 3/0235 345/169 |
| 2003/0030670 A1 | 2/2003 | Duarte et al. |
| 2004/0015548 A1 * | 1/2004 | Lee ............................... 709/204 |
| 2004/0078444 A1 * | 4/2004 | Malik ........................... 709/206 |
| 2005/0027669 A1 * | 2/2005 | Day ..................... G06Q 10/107 |
| 2006/0075029 A1 * | 4/2006 | Kelso et al. ................... 709/206 |

(Continued)

FOREIGN PATENT DOCUMENTS

JP      2002-157205 A    5/2002
WO      WO 01/24036 A3   4/2001

(Continued)

OTHER PUBLICATIONS

Sinha, Nirmalya (Government of India Patent Office), First Examination Report dated Aug. 18, 2010.

(Continued)

*Primary Examiner* — Jerry Dennison
(74) *Attorney, Agent, or Firm* — Ridout & Maybee LLP

(57) ABSTRACT

A method and apparatus for conducting at least two concurrent conversation sessions is provided whereby a user may quickly switch between sessions. A graphical user interface may be provided comprising a first portion for conducting a first communication session and a second portion for immediately invoking a switch to a second communication session. In operation, the first portion of the graphical user interface is switched to immediately conduct said second communication session in response to a user input to invoke the switch. The second component can display notifications for concurrent session activities and a particular notification selected by a user to invoke the switch.

31 Claims, 9 Drawing Sheets

(56) References Cited

U.S. PATENT DOCUMENTS

| | | | | |
|---|---|---|---|---|
| 2006/0174010 | A1* | 8/2006 | Deshpande | H04L 12/2803 709/227 |
| 2006/0174207 | A1* | 8/2006 | Deshpande | G06Q 10/107 715/758 |
| 2007/0033254 | A1* | 2/2007 | AlHusseini | H04L 67/38 709/205 |
| 2007/0192413 | A1 | 8/2007 | Murakami et al. | |

FOREIGN PATENT DOCUMENTS

| | | | |
|---|---|---|---|
| WO | WO 03/014905 A3 | 2/2003 | |
| WO | 2004104758 A2 | 2/2004 | |
| WO | 2004040461 A1 | 5/2004 | |
| WO | WO 2005/041086 A1 | 5/2005 | |

OTHER PUBLICATIONS

State Intellectual Property Office of People's Republic of China, Office Communication issued in respect of Chinese Patent Application No. 200610092527.7, dated Mar. 24, 2011.
Barker, Brettell, Response to European Search Report dated Jun. 6, 2012, filed in European Patent Application No. 11173361.4-2414.
Japanese Patent Office, Notice of Final Rejection dated Jan. 6, 2012, issued in respect of Japanese Patent Application No. 2006-167858 (together with an English Translation).
Shusaku Yamamoto, Response to Office Communication in respect of Japanese Patent Application No. 2006-167858, dated Sep. 13, 2011, together with an English translation of the claims as amended.
Canadian Intellectual Property Office, Office Communication issued in respect of Canadian Patent Application No. 2,549,514, dated Aug. 2, 2011.
Intellectual Property Office of India, Office Communication issued in respect of Indian Patent Application No. 1406/DEL/2006, dated Aug. 10, 2011.
Anand and Anand, Response to Office Communication issued in respect of Indian Patent Application No. 1406/DEL/2006, dated Aug. 19, 2011.
Anand and Anand, Response to Office Communication issued in respect of Indian Patent Application No. 1406/DEL/2006, dated May 2, 2011.
European Patent Office, Communication pursuant to Article 94(3) EPC, issued in respect of European Patent Application No. 05105408.8, dated Jul. 10, 2009.
Barker Brettell, Response to Office Communication, issued in respect of European Patent Application No. 05105408.8, dated Oct. 29, 2009.
Ipulse, Response to Office Communication, issued in respect of European Patent Application No. 05105408.8, dated Dec. 24, 2005.
Japanese Patent Office, Notice of Reasons for Rejection, issued in respect of Japanese Patent Application No. 2006-167858, dated May 31, 2011, together with an English translation thereof.
Korean Intellectual Property Office, Notice Requesting Submission of Opinion, issued in respect of Korean Patent Application No. 10-2006-0054302, dated Sep. 21, 2007, together with an English translation thereof.
Korean Intellectual Property Office, Notice of Decision of Final Rejection, issued in respect of Korean Patent Application No. 10-2006-0054302, dated Apr. 16, 2008, together with an English translation thereof.
Korean Intellectual Property Office, Notice of Decision for Patent, issued in respect of Korean Patent Application No. 10-2006-0054302, dated Jan. 20, 2009 (English translation).
Korean Intellectual Property Office, Certificate of Patent, issued in respect of Korean Patent Application No. 10-2006-0054302, dated Mar. 19, 2009, together with an English translation thereof.
European Patent Office, Extended European Search Report dated Nov. 8, 2011, issued in respect of European Patent Application No. 11173361.4.
European Patent Office, European Search Report dated Oct. 27, 2005, issued in respect of European Patent Application No. 05105408.8.
No Author Name Supplied in Source Data: "Dissipating Sametime Windows" IP.com Journal, IP.com Inc., West Henrietta, NY, US, Aug. 6, 2004, XP013021051 ISSN: 1533-0001.

* cited by examiner

METHOD AND APPARATUS FOR SWITCHING BETWEEN CONCURRENT MESSAGING SESSIONS

FIELD OF THE INVENTION

This matter relates to a user interface for a messaging application and more particularly for method and apparatus for switching between concurrent messaging sessions.

BACKGROUND OF THE INVENTION

Mobile and other communication devices are increasingly popular and find use in both personal and business-related contexts. User's often choose among various communication devices, especially wireless communication devices, using convenience of use as a criterion.

Current communication devices typically offer a variety of forms of data communication including email, short message service (SMS), instant messaging (IM), etc. A user of a device adapted for IM, for example, may desire to carry on concurrent but separate conversations with two or more IM contacts (i.e. users of other IM configured devices). Switching between concurrent messaging sessions (i.e. conversations) is often cumbersome. In the case of IM, a user typically must quit an IM application interface for a current conversation, go to a contacts screen, locate the other conversation and open an interface for that other conversation to be able to respond to a new message, etc. In some environments, a user's experience is even more cumbersome if a particular conversation was opened from the context of another (i.e. an outer) application other than the IM application. An outer application such as a message list application providing a unified view of message activity on a device may be used as an initial interface to launch the IM application. When doing so, to switch to another conversation, the user may have to quit current conversation within the IM application and possibly quit the outer application (i.e. message list), re-open the IM application, find the desired conversation in a contacts screen and then open the desired conversation. A problem with such a cumbersome sequence of interactions is that the user is distracted from the main task at hand, namely, the conversation. Conversations may take longer to complete and a user may become dissatisfied with the device.

A solution to one or more of these problems and needs is therefore desired.

BRIEF DESCRIPTION OF THE DRAWINGS

In order that the subject matter may be readily understood, embodiments are illustrated by way of examples in the accompanying drawings, in which.

DETAILED DESCRIPTION

A method and apparatus for conducting at least two concurrent conversation sessions is provided whereby a user may quickly switch between sessions. A graphical user interface may be provided comprising a first portion for conducting a first communication session and a second portion for immediately invoking a switch to a second communication session. In operation, the first portion of the graphical user interface is switched to immediately conduct said second communication session in response to a user input to invoke the switch. The second component can display notifications for concurrent session activities and a particular notification selected by a user to invoke the switch. Other features and aspects will also be apparent.

Persons of ordinary skill in the art will appreciate that teachings herein are applicable to messages received via wired or wireless communication and though a wireless communication device and network are discussed in the examples, no limitations should be imposed.

Figure 1:
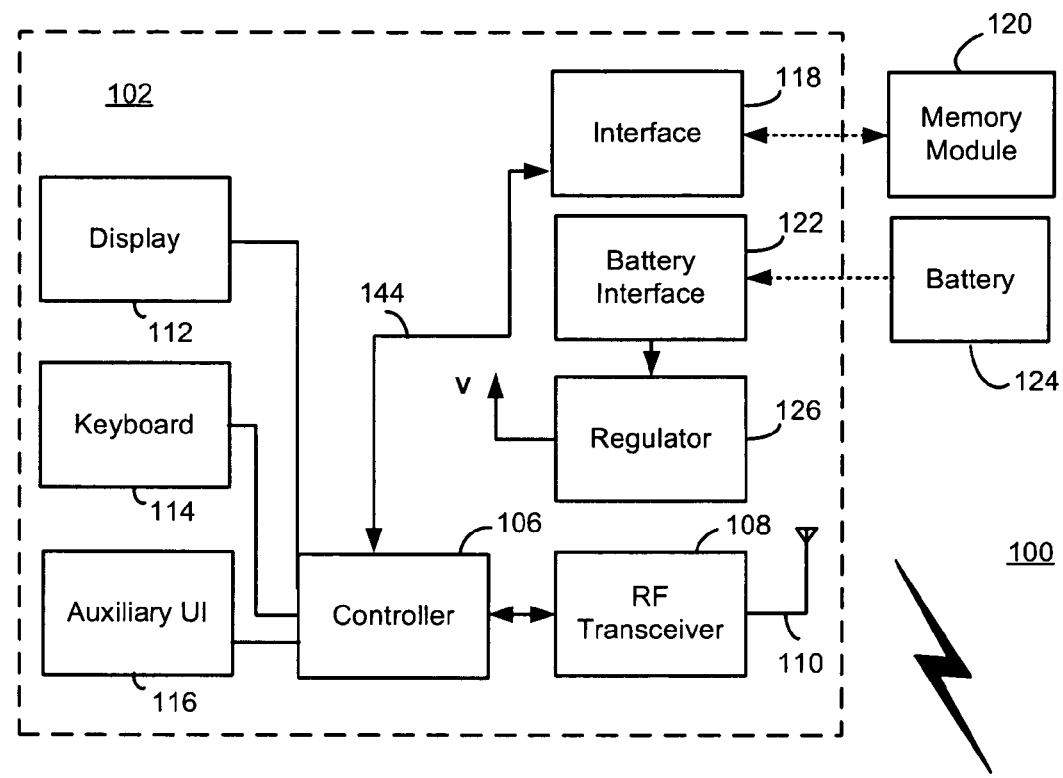
FIG. 1 is a block diagram which illustrates pertinent components of an example wireless communication network and a mobile station which communicates within this network.
Figure 1:
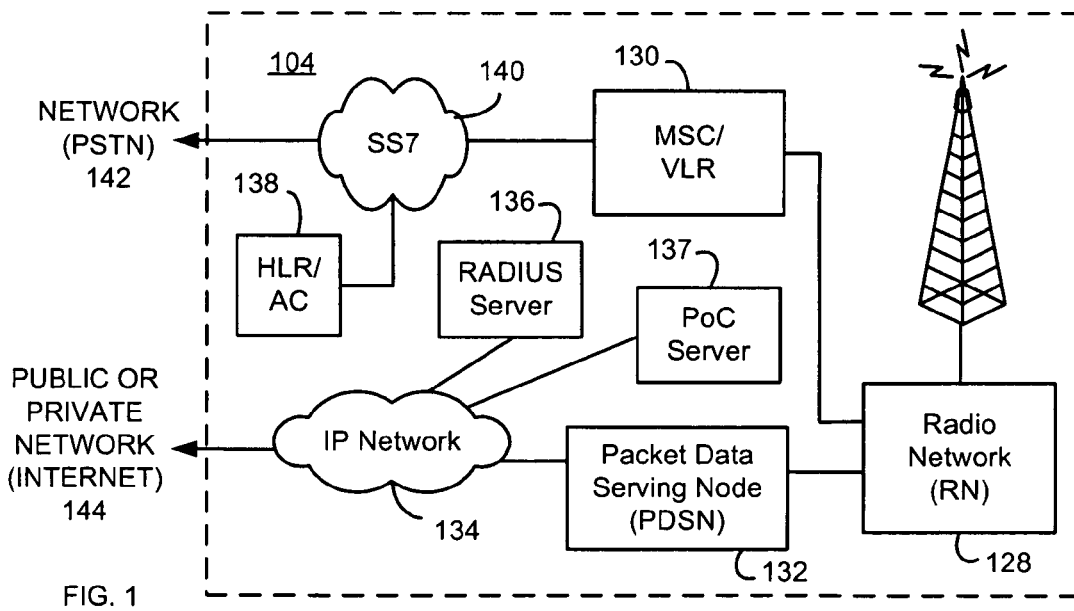

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. When mobile station 102 is fully operational, an RF transmitter of RF transceiver circuitry 108 is typically turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a memory module 120, such as a Subscriber Identity Module (SIM) or a Removable User Identity Module (R-UIM), which is connected to or inserted in mobile station 102 at an interface 118. As an alternative to a SIM or an R-UIM, mobile station 102 may operate based on configuration data programmed by a service provider into an internal memory which is a non-volatile memory. Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, and one or more auxiliary UIs 116, and controller 106 may remain within the radio modem unit that communicates with the computer's CPU or be embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. In the embodiment of FIG. 1, wireless network 104 is a Third Generation (3G) supported network based on Code Division Multiple Access (CDMA) technologies. In particular, wireless network 104 is a CDMA2000 network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet). Persons of ordinary skill in the art will appreciate that other networks and associated topologies including GPRS, E-GPRS and UMTS radio networks, among many others, may be employed with the teachings herein.

During operation, mobile station 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile stations 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138. In order to provide packet data services to mobile station 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Wireless communication network 104 also includes a Push-to-talk over Cellular (PoC) server 137 which may be coupled to IP network 134. PoC server 137 operates to facilitate PoC individual and group communication sessions between mobile stations within network 104. A conventional PoC communication session involves a session connection between end users of mobile stations, referred to as session "participants", who communicate one at a time in a half-duplex manner much like conventional walkie-talkies or two-way radios.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
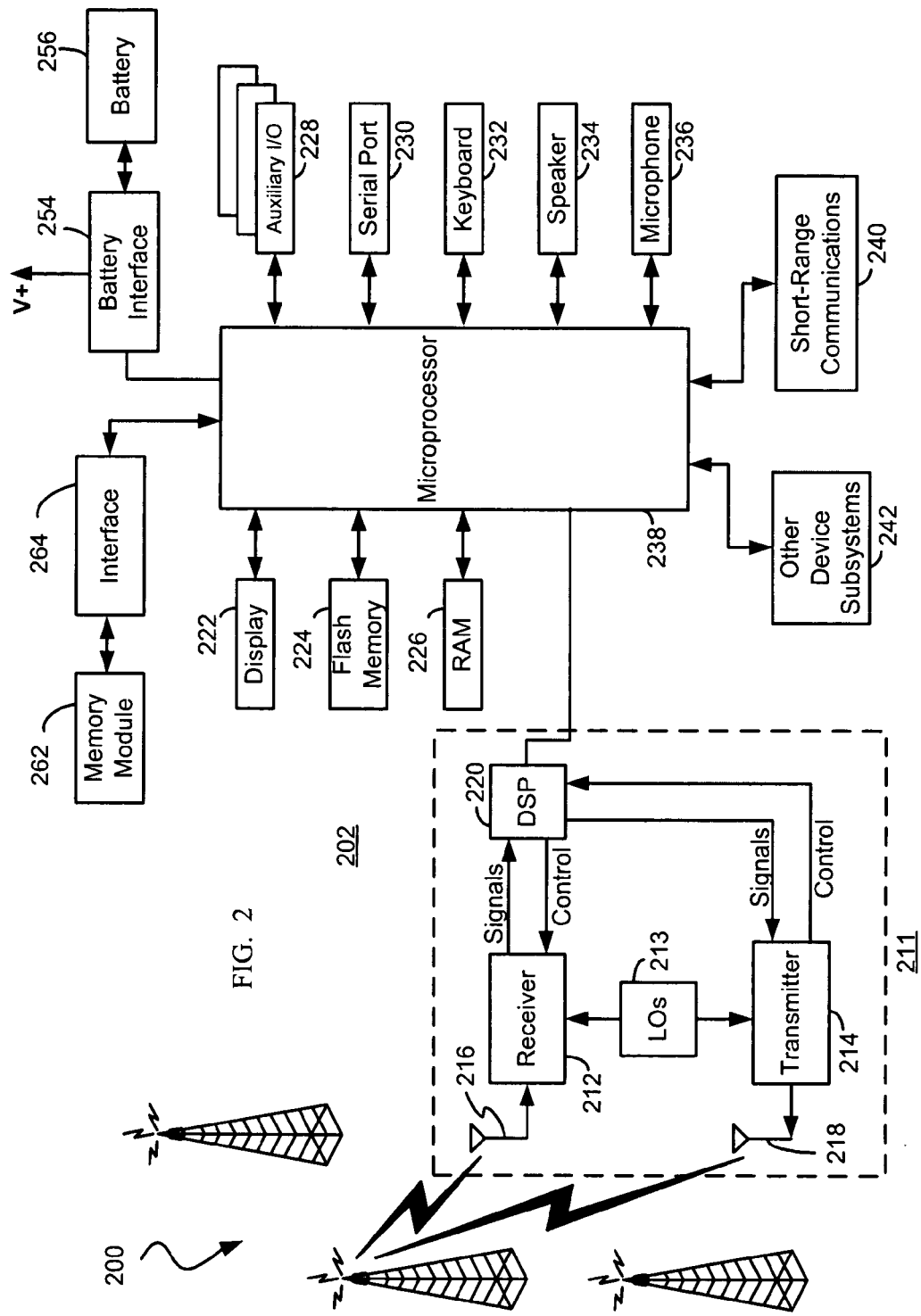
FIG. 2 is a more detailed diagram of the mobile station which may communicate within the wireless communication network.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Alternatively, memory module 262 may be a non-volatile memory which is programmed with configuration data by a service provider so that mobile station 202 may operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 2) which provides power V+ to all of the circuitry.

Mobile station 202 includes a microprocessor 238 (which is one implementation of controller 106 of FIG. 1) which controls overall operation of mobile station 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

One function of PIM is to provide a GUI for accessing messages received or sent by station 202. A message collection application is an example of a user interface for displaying different types of messages received and sent by mobile station 202.

Figure 5:
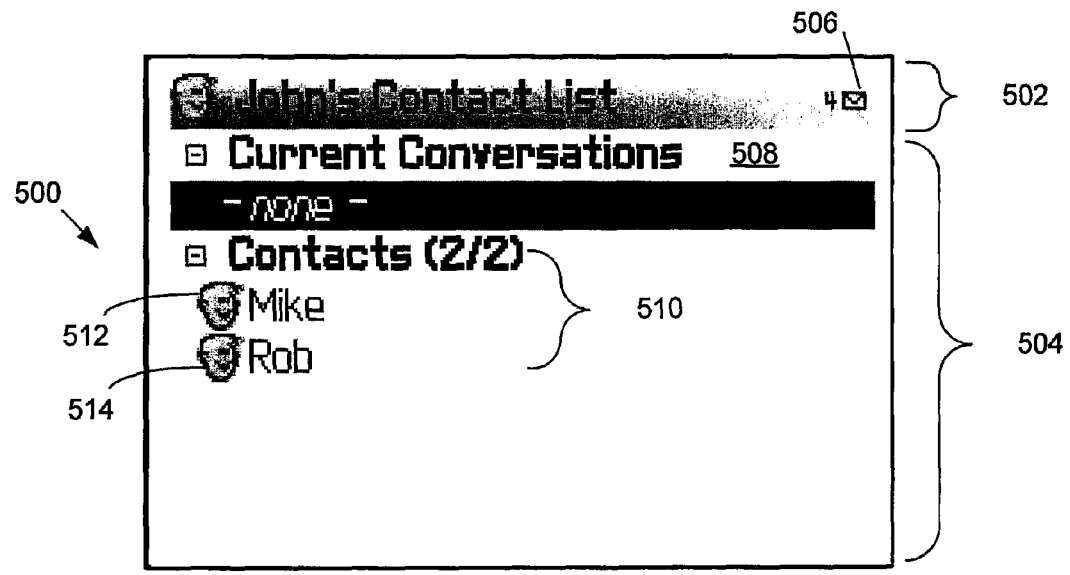
FIGS. 5-14 are representative GUI display views of an IM application showing various examples of operations in accordance with an embodiment.

FIG. 5 illustrates an example view 500 of a IM application adapted in accordance with an embodiment. View 500 comprises an application identification portion 502 for showing various information about the IM application and selected device status information such as, for example, battery level, wireless network signal level, current time and date, (not shown) and new message count 506 showing 4 new emails, etc. Portion 502 may be displayed on all or selected views of the IM application. View 500 further comprises a main active portion 504 for presenting information and receiving user commands for controlling the IM application. Active portion 504 in view 500 includes a list of current active conversations 508 and contacts 510 with whom a user (referred to as "John") of the mobile station 202 may communicate via IM. Two representative contacts 510 are listed, namely "Mike" 512 and "Rob" 514 though persons of ordinary skill in the art will appreciate that a user of a mobile station 202 will usually have more contacts. A contact (e.g. 512) from portion 504 may be selected to initiate a conversation via the contact's associated communication device (not shown).

Figure 6:
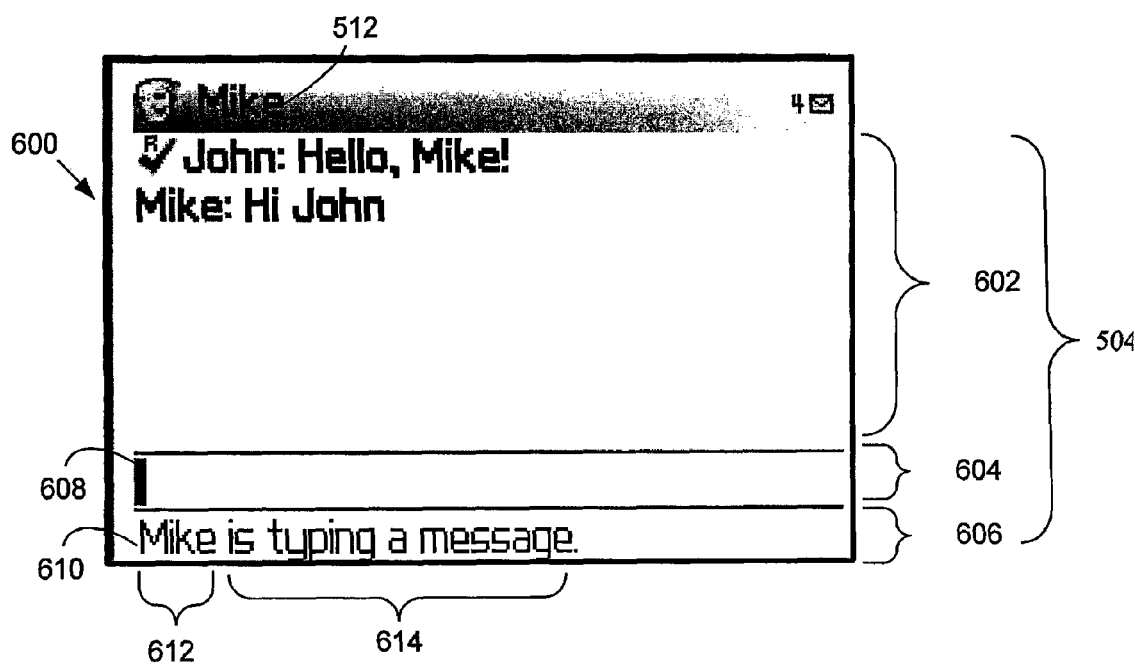

FIG. 6 illustrates a view 600 of portion of a conversation between John and Mike 512. Active portion 504 of view 600 comprises a message display portion 602, a message composition portion 604 and a quick switch and notification portion 606 in accordance with an embodiment. A focus device is used to show which portion of the view 600 is active for receiving a user's input. View 600 comprises a cursor 608 focus device for inputting messages in portion 604. Quick switch and notification portion 606 provides an area of the view 600 to display notifications concerning a current communication session (i.e. between John and Mike) and other concurrent sessions, if any (See FIG. 7). By way of example, portion 606 displays a representative notification concerning the session between John and Mike, namely a notification 610 advising that Mike is typing a message. The notification preferably comprises a contact part 612 identifying the contact who is the subject of the notification and an activity part 614 identifying the contact's activity that is the subject of the notification. If no concurrent session is active, quick switch and notification portion 606 may function only as a notification means unless and until a further communication session becomes active.

Figure 7:
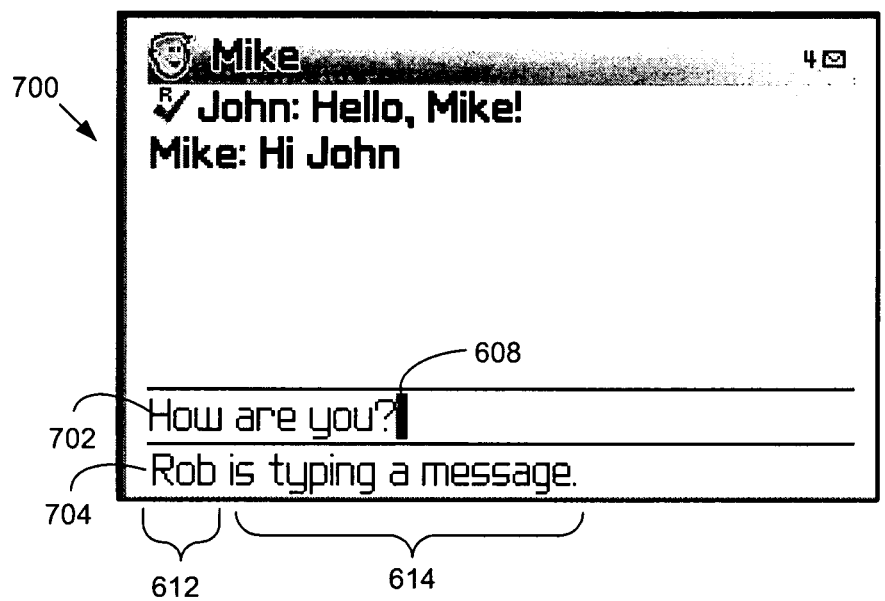

With reference to FIG. 7, there is shown a view 700 illustrating a new message 702 being composed by John for his conversation with Mike and a notification 704 to John that contact Rob 514 is typing a message to John in a concurrent session to which John may switch as desired. Notification 704 preferably comprises the same two part format 612 and 614.

Figure 8:
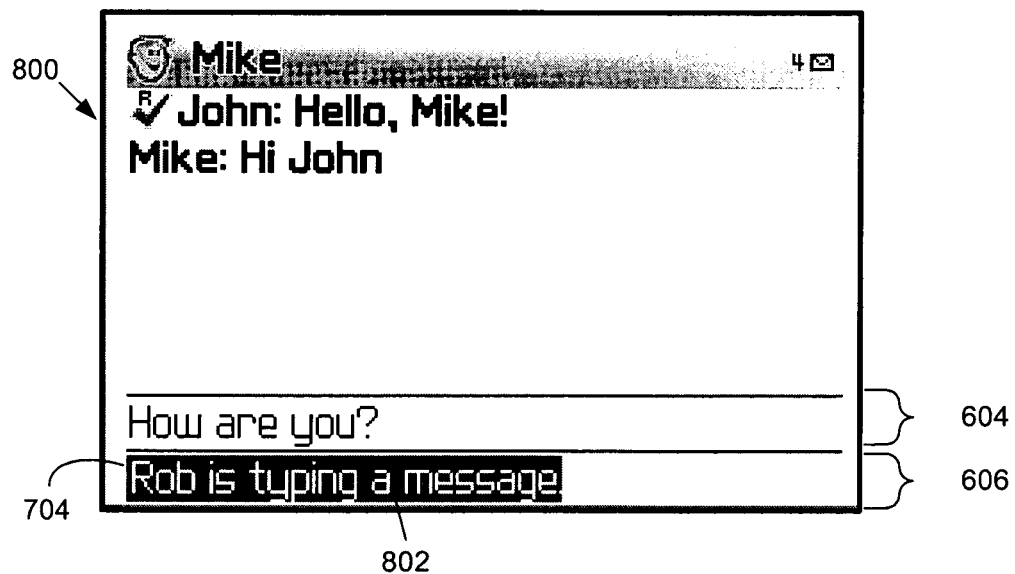

With reference to FIG. 8, there is shown view 800 of the IM application with the focus moved from message composition portion 604 to quick switch and notification portion 606. The focus is illustrated using reverse video mode 802 to display notification 704 but other focus devices could be used (e.g. font changes, highlighting, blinking, outline etc.) well known in the art. The focus may be moved between portions 604 and 606 using one or more input devices of station 202 including any arrow keys of keyboard 232 or auxiliary I/O 228 such as a thumbwheel or a pointing device, etc.

Figure 9:
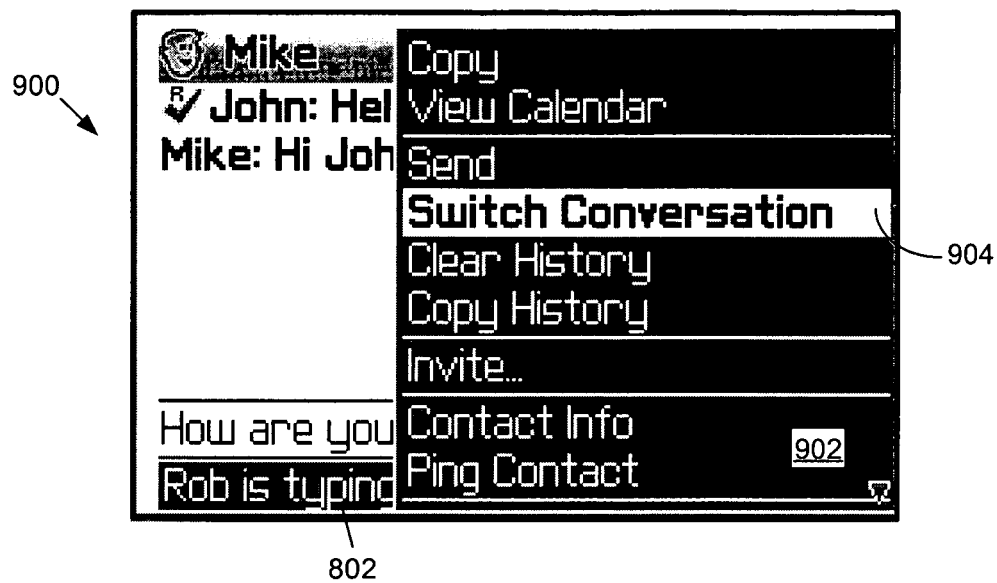
Figure 10:
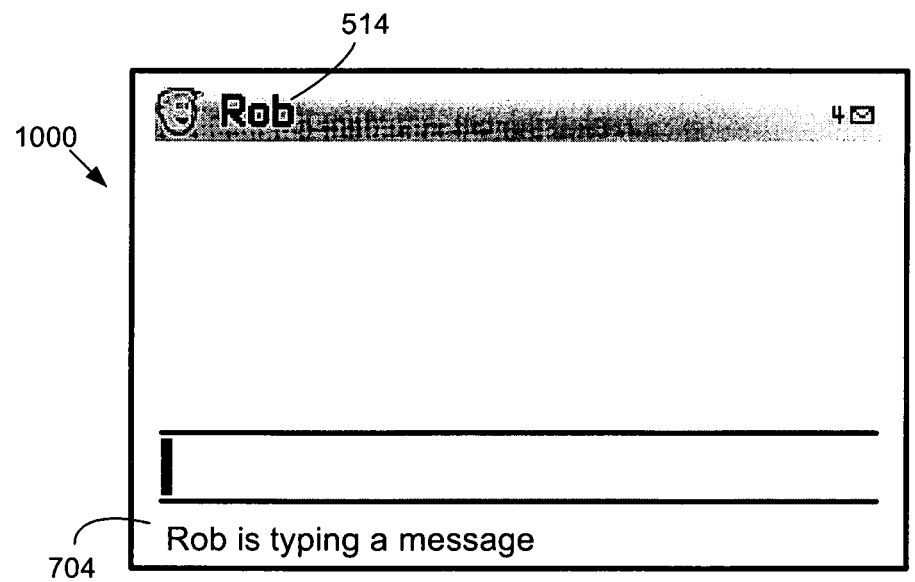

Switching between the current IM session between John and Mike to a concurrent session between John and Rob is facilitated through portion 606. A notification (e.g. 704) from the other session is selected by moving the focus to the portion 606. Each respective notification is associated with the session which originated the activity. A user may press an enter key of keyboard 232 (or another predetermined key) to input the switch command directly or press a key or use an aux. I/O device 228 to bring up an options menu. FIG. 9 illustrates an options menu 902 in a view 900 with which to instruct a switch or other commands using an appropriate command selection (e.g. 904). FIG. 10 illustrates a view 1000 of the IM application following a quick switch showing a new conversation between John, the user of station 202 and contact Rob 514.

Should more than one other concurrent session exist, notifications therefor may be presented via quick switch and command portion 606 in a variety of manners. For example, notifications may be queued with the most current notification displayed in portion 606 and aged notifications available by scrolling through the queue. As a notification from a particular session is made obsolete by a newer notification from the same session, the older notification may be removed/replaced. Notifications may be scrolled in known ways such as via a space key or arrow keys, etc. of keyboard 232 or another input device of station 202.

Figure 11:
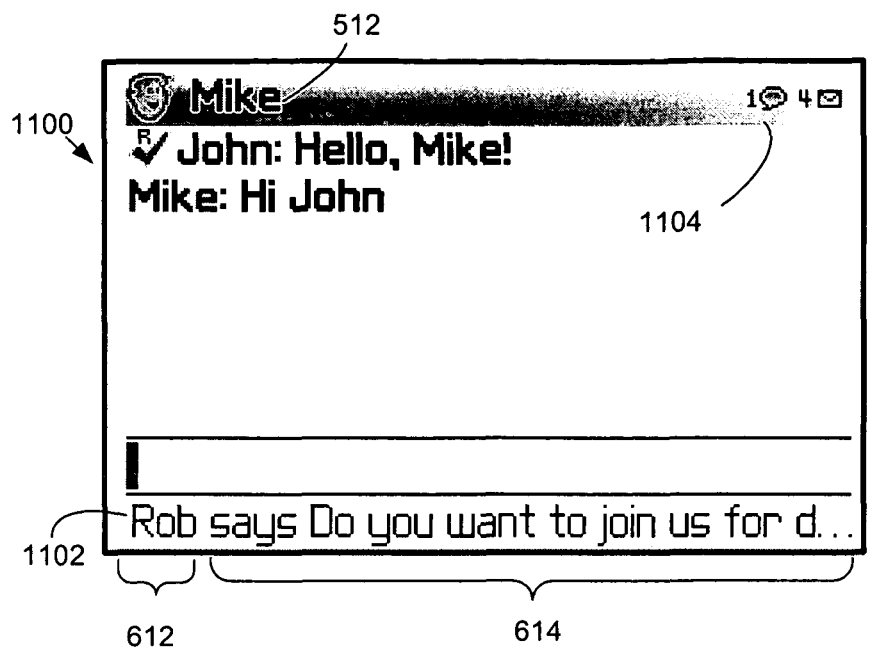

The notification and switch features illustrated with respect to typing activities may be offered for new message activity as well. For example, FIG. 11 illustrates a view 1100 of a session between John and contact Mike 512 similar to view 600 however, quick switch and notification portion 606 displays a new message notification 1102 comprising a same format as earlier notifications namely a contact portion 612 and activity portion 614 in the form of a portion of the message received. A new message notification 1104 icon and count may be added to application identification portion 502 as well to indicate a new IM message is received.

Figure 12:
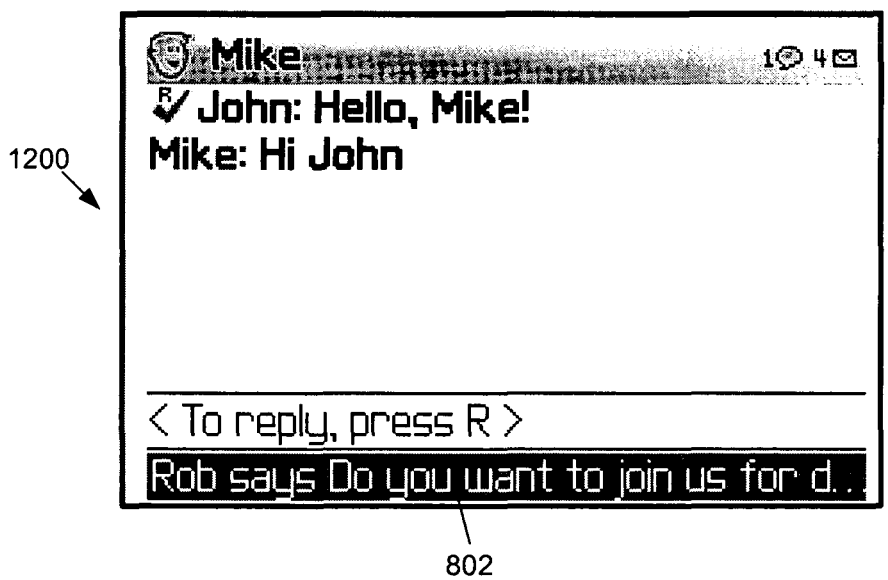
Figure 13:
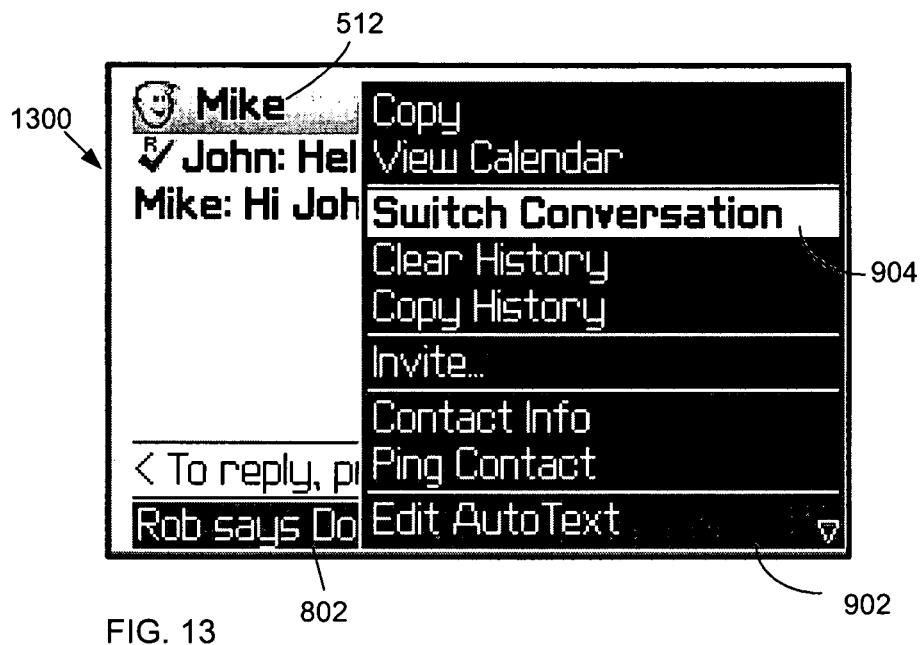

To reply to the new message from contact Rob 514, a user may move the focus to portion 606 to select the notification 1102 (view 1200 of FIG. 12) and switch as discussed previously and as shown in view 1300 of FIG. 13. The user may press "R" to reply (or another pre-determined key of keyboard 232) thereby invoking the switch and beginning a new message composition as per view 1400 of FIG. 14. Switching by a shortcut key or via a menu may bring the user to the desired conversation and—for convenience purposes—set the focus to the message composition portion 604, so that there is no need to press "R" or any other shortcut key at the new conversation to continue with message composition. Switching in response to typing or other notification messages may be performed in a like manner.

Figure 14:
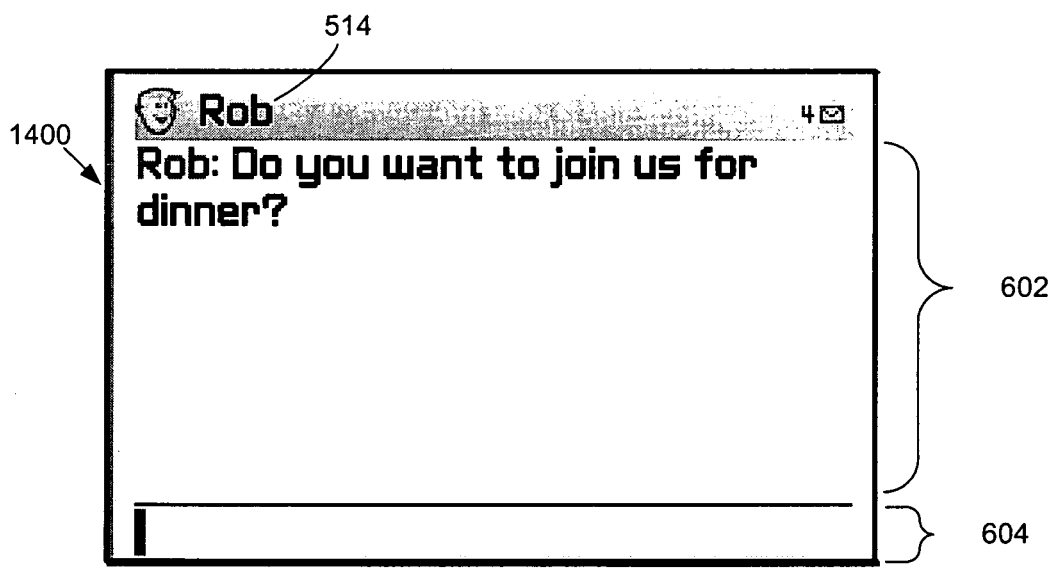

It should be noted with reference to FIG. 14 that the quick switch and notification portion 606 need not be displayed if there are no notifications. Message composition portion 604 may be positioned within the view to replace portion 606 thereby to increase the size of conversation message display portion 602. Alternatively message composition portion 604 could be enlarged to hide portion 606 as desired to emphasize this component in the view. Once a notification is occasioned, quick switch and notification portion 606 may be displayed and message composition portion 604 moved accordingly. Optionally, portion 606 may be displayed regardless of whether a notification is available. Persons of ordinary skill in the art will appreciate then that, with reference to FIG. 10, had Rob stopped typing the message which notification triggered the switch, the bottom portion of view 1000 would look like the bottom portion of view 1400.

Figure 3:
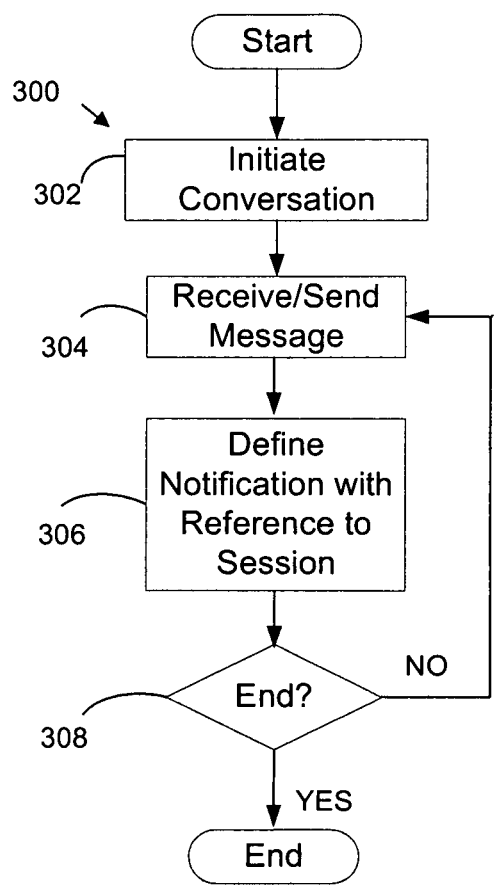
FIG. 3 is flow diagram showing operations for an individual communication session among two or more concurrent communication sessions within which a user may desire to switch in accordance with an embodiment.
Figure 4:
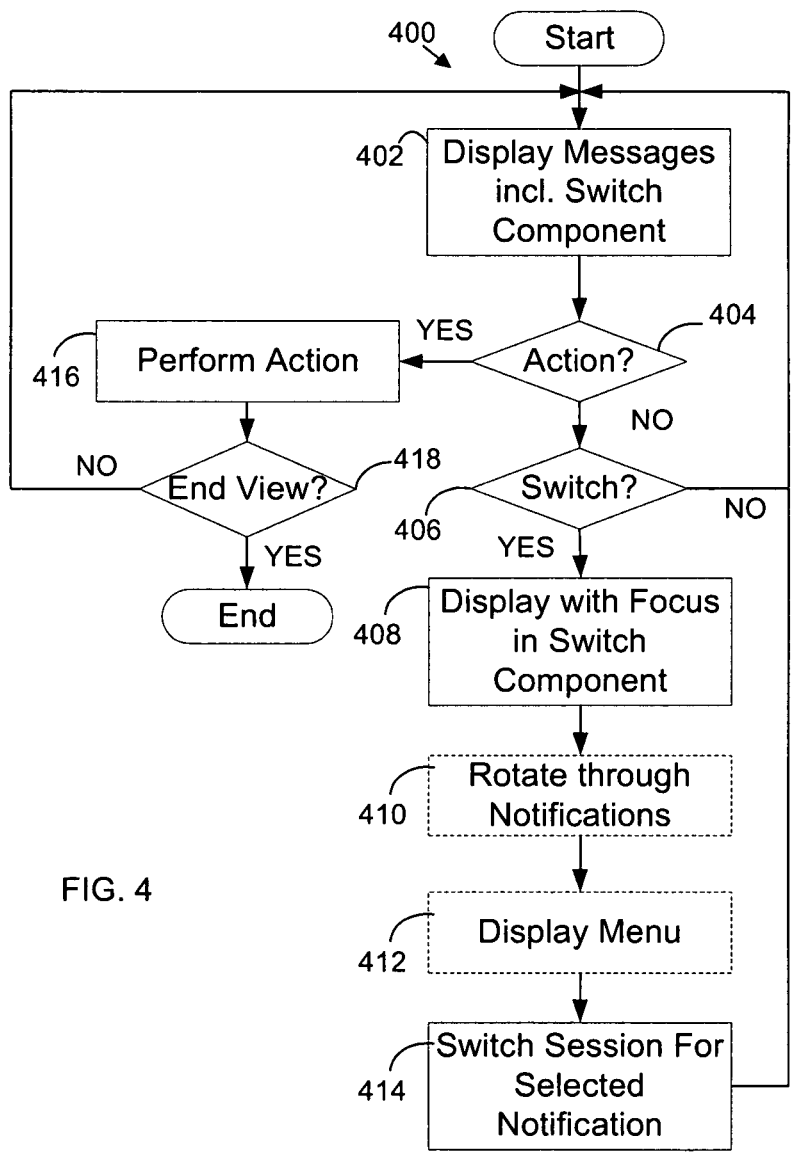
FIG. 4 is flow diagram showing an IM application which displays messages for an individual communication session and permits a quick switch to another of any concurrent communication sessions.

With reference to FIGS. 3 and 4 there is illustrated operations for a quick switch and notification session feature in accordance with an embodiment. Persons of ordinary skill in the art will appreciate that such operations may be embodied within computer instructions (software) for configuring mobile station 202, for example a non-transitory machine readable medium comprising program code recorded thereon executable on a computer processor for implementing a method for operating the mobile station 202.

With reference to operations 300, an IM session is initiated 302 between a user of device 202 and another remote user (e.g. contact Mike 512). At step 304 a message is sent or received in the conversation session. At step 308 a notification is defined for presenting the activity to the user of station 202 in a view of IM activity such as previously discussed. A display portion of the notification preferably comprises a first part identifying the contact originating the activity and a second part describing the activity or including a portion of the message received, as applicable. Typically notifications need only be defined for messages received. Each notification is associated with the particular session which originated the activity to facilitate a switch to such a session when the notification is activated (displayed, selected and commanded) from another session. Notification for a particular communication session (e.g. a contact is typing a message) may be displayed within a view of the particular session or only in views for other concurrent sessions as desired and which option may be made user configurable.

Operations 304 and 306 may be repeated until the particular session ends (step 308). Operations 300 may be performed for respective concurrent sessions.

With reference to operations 400, meanwhile, an IM application graphical user interface component of station 202 may be invoked to display any messages and notifications in a quick switch screen component for a particular conversation session (step 402). The focus is initiated within a composition screen component (e.g. portion 604). A user may perform actions within the currently displayed conversation such as typing a message or invoking a menu of options relative to the position of the focus.

Notifications, if any, are displayed in a quick switch and notification component (e.g. 606) the location of which is typically adjacent the composition screen component which, in the present embodiment, is just below the portion 604 along a bottom portion of a view of the graphical user interface. The bottom portion is a convenient location for the user as it maximizes the available space for displaying messages in message display portion 602. Switching a focus between the portion 604 and 606 is fast and easily noticeable by the user. However, the display of the switch and notification component is preferably dynamically operable to be displayed only when a notification is available. Otherwise, the switch and notification component is typically hidden to further maximize the amount of display space for other components in the view. The other components may comprise a message display component showing a history of messages in a conversation. A message composition component may be displayed within the location of the switch and notification component or enlarged accordingly as desired.

At step 404 a determination is made whether an action with respect to the current conversation is input or selected by a user. If no such action is desired, via No branch to step 406 a determination is made whether the user has navigated to the switch component (e.g. portion 606). If yes, at step 408, the focus is moved to the switch component. If no, operations may repeat from step 402. With the focus in the switch component, optionally and in accordance with any queued notifications, a user may navigate through the notifications (step 410) to select a desired notification. Optionally a menu of commands may be invoked and displayed (step 412). At step 414 a user invokes a switch such as discussed previously. Operations 400 may be repeated for the newly selected session.

If at step 404 a user action is desired with respect to the current conversation, via yes branch to step 416, the action is performed in response to the user's direction (e.g. message typing, command invocation such as exit, etc.) An action may include displaying a menu of command options. If the particular action ends the current view of the session (step 418) operations 400 end. Otherwise, they may repeat from step 402.

Persons of ordinary skill in the art will appreciate that the quick switch component facilitates a switching shortcut between different conversation sessions. In the illustrated embodiments, within a messaging application adapted with such a component, a user may navigate (e.g. scroll) to the component and type a particular key(s) or simply invoke a corresponding menu item to switch sessions.

The quick switch component illustrated also provides an informative function by presenting notifications about concurrent sessions. The quick switch component is preferably located about a bottom portion of a view for the messaging application and preferably below a message composition component to facilitate easy navigation between the composition and switch components and to not clutter a message display (i.e. history) portion of the view. A fixed location and reserved portion of the overall viewing space avoids pop-up and other potentially distracting dialog interfaces. A plurality of notifications may be received and queued for viewing at the election of the user.

The above-described embodiments of the present application are intended to be examples only. Although the present application includes description of a method, a person of ordinary skill in the art will understand that the application is also directed to an apparatus and a machine readable medium comprising program code recorded thereon executable on a computer processor for implementing the disclosed method. Those of skill in the art may effect alterations, modifications and variations to the particular embodiments without departing from the scope of the application. The subject matter described herein in the recited claims intends to cover and embrace all suitable changes in technology.

We claim:

1. A method for operating a mobile communication device, the method comprising:
    displaying, on the mobile communication device, a graphical user interface for a messaging application, the graphical user interface for the messaging application including:
        a message display portion displaying content of a single communication session; and
        a message composition portion;
    responsive to receipt of a notification relating to a second communication session, reducing a dimension of the message display portion of the graphical user interface to accommodate display of a switch and notification portion;
    displaying, in the switch and notification portion, an indication that a message of the second communication session is being composed; and
    in response to an input at the switch and notification portion, displaying, in the message display portion, content of the second communication session in place of the content of the single communication session.

2. The method of claim 1 wherein the single communication session is a peer-to-peer conversation.

3. The method of claim 1 wherein said switch and notification portion comprises an activity originator portion and an activity portion, the indication that a message of the second communication session is being composed being displayed in the activity portion.

4. The method of claim 1 wherein when there is a plurality of notifications, said plurality of notifications are provided in a queue in said switch and notification portion in order to facilitate navigation of said notifications and wherein said method further comprises receiving input to select a particular notification from said plurality of notifications.

5. The method of claim 1 wherein the single communication session comprises an instant messaging conversation.

6. The method of claim 1 wherein said second communication session is a selected one of two or more other communications sessions being concurrently conducted with the single communication session.

7. The method of claim 1 further comprising:
    providing a menu of options in response to the input at the switch and notification portion of the graphical user interface, the menu including a link for invoking a switch to the second communication session,
    wherein the displaying, in the message display portion, content of the second communication session is responsive to receipt of a selection of the link for invoking the switch.

8. The method of claim 1 wherein the switch and notification portion is displayed adjacent to the message composition portion of the graphical user interface.

9. The method of claim 1 wherein the messaging application is an instant messaging application.

10. A mobile communication device comprising:
    a communications module for sending and receiving messages of communication sessions; and
    a processor coupled to the communications module, the processor configured to execute stored machine-readable instructions for causing the mobile communication device to:
        display a graphical user interface for a messaging application, the graphical user interface for the messaging application including:
            a message display portion displaying content of a single communication session; and
            a message composition portion;
        responsive to receipt of a notification relating to a second communication session, reduce a dimension of the message display portion of the graphical user interface to accommodate display of a switch and notification portion;
        display, in the switch and notification portion, an indication that a message of the second communication session is being composed; and
        in response to an input at the switch and notification portion, display, in the message display portion, content of the second communication session in place of the content of the single communication session.

11. The device of claim 10 wherein the single communication session is a peer-to-peer conversation.

12. The device of claim 10 wherein the instructions further configure the processor to:
    provide a menu of options in response to the input at the switch portion of the graphical user interface, the menu including a link for invoking a switch to the second communication session,
    wherein the displaying, in the message display portion, content of the second communication session is responsive to receipt of a selection of the link for invoking the switch.

13. The device of claim 10 wherein said switch and notification portion comprises an activity originator portion and an activity portion, the indication that a message of the second communication session is being composed being provided in the activity portion.

14. The device of claim 10 wherein the instructions further configure the processor to queue and facilitate navigation of a plurality of notifications in the switch and notification portion and to receive input to select a particular notification from said plurality of notifications.

15. The device of claim 10 wherein the single communication session comprises an instant messaging conversation.

16. The device of claim 10 wherein the instructions further configure the mobile communication device to display the switch and notification portion adjacent to the message composition portion of the graphical user interface.

17. The device of claim 10 wherein the instructions configure the mobile communication device to hide the switch and notification portion in an absence of the notification.

18. The device of claim 10 wherein the messaging application is an instant messaging application.

19. A non-transitory machine readable medium comprising program code recorded thereon executable by a processor for causing a mobile communication device to:
   display a graphical user interface for a messaging application, the graphical user interface for the messaging application including:
      a message display portion displaying content of a single communication session; and
      a message composition portion;
   responsive to receipt of a notification relating to a second communication session, reduce a dimension of the message display portion of the graphical user interface to accommodate display of a switch and notification portion;
   display, in the switch and notification portion, an indication that a message of the second communication session is being composed; and
   in response to an input at the switch and notification portion, display, in the message display portion, content of the second communication session in place of the content of the single communication session.

20. The medium of claim 19, further comprising program code for causing the mobile communication device to display the switch and notification portion adjacent to the message composition portion of the graphical user interface.

21. The medium of claim 19, further comprising program code for causing the mobile communication device to hide said switch and notification portion in an absence of the notification.

22. The medium of claim 19 wherein the messaging application is an instant messaging application.

23. A method for operating a messaging application on a mobile communication device, the messaging application comprising a graphical user interface having an application identification portion and a main active portion, the method comprising:
   displaying the graphical user interface for the messaging application on a display screen of the mobile communication device;
   displaying a list of contacts in the main active portion;
   in response to receiving a first input indicating selection of a first contact in the list of contacts, displaying, in the main active portion, a first conversation view, the first conversation view relating to a communication session with the first contact, the first conversation view including:
      a first message display portion displaying content of the communication session with the first contact; and
      a first message composition portion;
   responsive to receipt of a notification relating to a second communication session with a second contact, reducing a dimension of the first message display portion of the graphical user interface to accommodate display of a first switch and notification portion;
   in response to receiving information related to a second message from the second contact, displaying, in the switch and notification portion, an indication that the second message is being composed; and
   in response to receiving a second input indicating selection of the switch and notification portion, displaying, in the main active portion, a second conversation view, the second conversation view relating to the second communication session with the second contact, the second conversation view including:
      a second message display portion displaying content of the second communication session with the second contact; and
      a second message composition portion.

24. The method of claim 23, wherein the application identification portion comprises at least one of messaging application information, mobile communication device status information, a battery level, a wireless network signal level, a current time and a current date.

25. The method of claim 23, wherein the messaging application is an instant messaging application.

26. A mobile communication device comprising:
   a communications system for sending and receiving messages of communication applications;
   a display screen; and
   a processor coupled to the communications system and the display screen, the processor configured to execute stored machine-readable instructions for causing the mobile communication device to:
      display, on the display screen, a graphical user interface of a messaging application, the graphical user interface having an application identification portion and a main active portion;
      display a list of contacts in the main active portion;
      in response to receiving a first input indicating selection of a first contact in the list of contacts, display, in the main active portion, a first conversation view, the first conversation view relating to a communication session with the first contact, the first conversation view including:
         a first message display portion displaying content of the communication session with the first contact; and
         a first message composition portion;
      responsive to receipt of a notification relating to a second communication session with a second contact, reducing a dimension of the first message display portion of the graphical user interface to accommodate display of a first switch and notification portion;
      in response to receiving information related to a second message from the second contact, display, in the switch and notification portion, an indication that the second message is being composed; and
      in response to receiving a second input indicating selection of the switch and notification portion, display, in the main active portion, a second conversation view, the second conversation view relating to the second communication session with the second contact, the second conversation view including:
         a second message display portion displaying content of the second communication session with the second contact; and
         a second message composition portion.

27. The device of claim 26, wherein the application identification portion comprises at least one of messaging application information, mobile communication device status information, a battery level, a wireless network signal level, a current time and a current date.

28. The device of claim 26, wherein the messaging application is an instant messaging application.

29. A non-transitory machine readable medium comprising program code recorded thereon executable by a processor for causing a mobile communication device to:
   display, on a display screen of the mobile communication device, a graphical user interface of a messaging application, the graphical user interface having an application identification portion and a main active portion;
   display a list of contacts in the main active portion;
   in response to receiving a first input indicating selection of a first contact in the list of contacts, display, in the main active portion, a first conversation view, the first conversation view relating to a communication session with the first contact, the first conversation view including:
      a first message display portion displaying content of the communication session with the first contact; and
      a first message composition portion;
   responsive to receipt of a notification relating to a second communication session with a second contact, reducing a dimension of the first message display portion of the graphical user interface to accommodate display of a first switch and notification portion;
   in response to receiving information related to a second message from the second contact, display, in the switch and notification portion, an indication that the second message is being composed; and
   in response to receiving a second input indicating selection of the switch and notification portion, display, in the main active portion, a second conversation view, the second conversation view relating to the second communication session with the second contact, the second conversation view including:
      a second message display portion displaying content of the second communication session with the second contact; and
      a second message composition portion.

30. The medium of claim 29, wherein the application identification portion comprises at least one of messaging application information, mobile communication device status information, a battery level, a wireless network signal level, a current time and a current date.

31. The medium of claim 29, wherein the messaging application is an instant messaging application.

* * * * *